F. SINSINGER.
FISHING REEL.
APPLICATION FILED MAY 9, 1912.

1,087,694.

Patented Feb. 17, 1914.

Witnesses:
Harry G. Fleischer
F. George Barry

Inventor:
Frank Sinsinger
by his attorneys

UNITED STATES PATENT OFFICE.

FRANK SINSINGER, OF NEW YORK, N. Y.

FISHING-REEL.

1,087,694.  Specification of Letters Patent.  Patented Feb. 17, 1914.

Application filed May 9, 1912. Serial No. 696,185.

*To all whom it may concern:*

Be it known that I, FRANK SINSINGER, a subject of the Crown of Austria-Hungary, and resident of the borough of Manhattan, in the city and State of New York, have invented a new and useful Improvement in Fishing-Reels, of which the following is a specification.

The object of my invention is to provide for an adjustable drag upon the paying out of the fishing line upon what are known as free running spools. In reels of this type the gear connection between the winding crank and the spool is of such character that the line which is wound upon the spool may pay out freely or a varying degree of friction may be given, which tension is under the control of the angler.

One of the principal objects of my invention is to place a varying friction device upon the spool that will be within the immediate control of the angler, who may adjustably retard the paying out of the line with varying degrees of friction and yet permit the instant change to the free winding in of the line.

Figure 1:
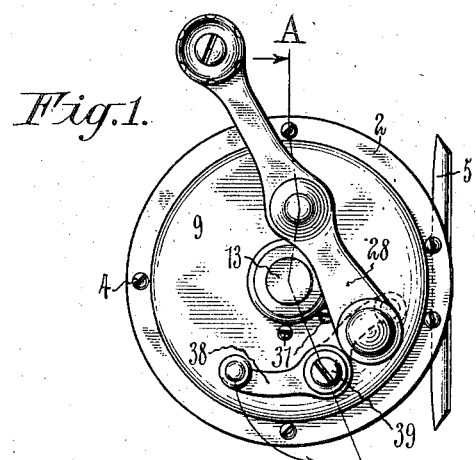
Figure 4:
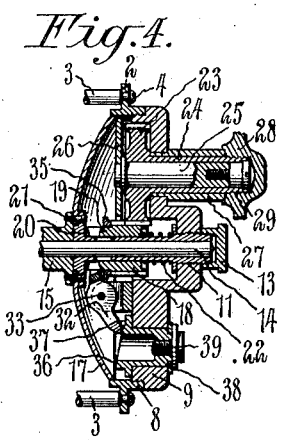
Figure 2:
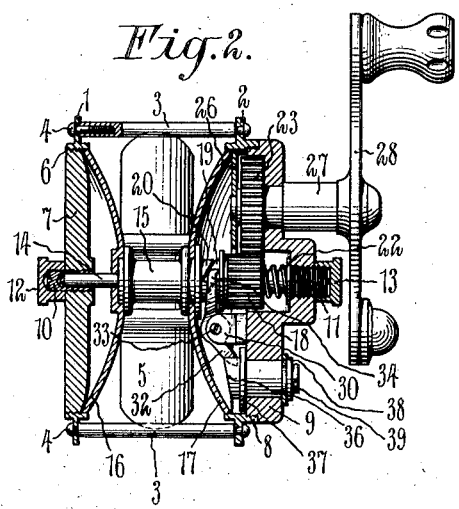
Figure 3:
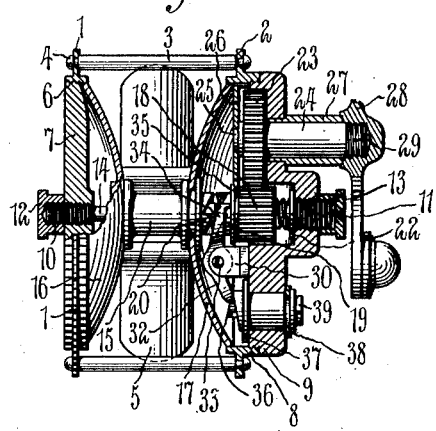
Figure 5:
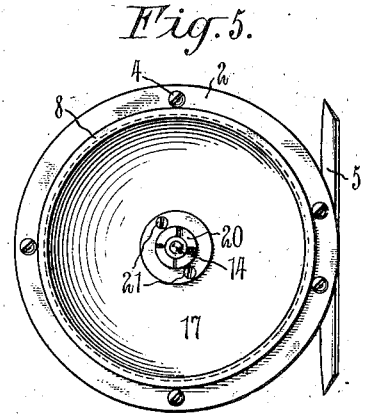
Figure 6:
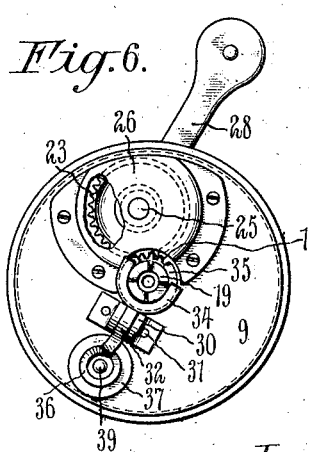

A practical embodiment of my invention is represented in the accompanying drawings in which, Figure 1 is an end view of a fishing reel provided with my improvement. Fig. 2 is a longitudinal section taken in the plane of the line A—A of Fig. 1, the clutch operating mechanism being shown in elevation thrown in as when applying the "drag" to the spool. Fig. 3 is a longitudinal section taken in the same plane as Fig. 1, the clutch operating mechanism being shown in elevation thrown out as when the spool is running free or paying out. Fig. 4 is a partial longitudinal central section, showing the clutch operating mechanism in the position as shown in Fig. 2. Fig. 5 is an end view of the reel frame and spool, showing one face of the clutch attached thereto, the end plate being removed. Fig. 6 is an inside view of the end plate, showing the other member and operating mechanism of the clutch.

Referring to the drawings, the cage-like frame consists of two annular rings, denoted by 1, 2, spaced apart and connected by tie rods 3 arranged at suitable intervals, the ends of said tie rods being secured between the two annular rings by means of screws 4. The concaved metal foot plate 5 is held upon the tie rods 3, at one side of the reel, permitting the same to be attached to the reel seat of the fishing rod in the usual manner.

The annular ring 1 is provided with an annular flange 6, which is interiorly screw-threaded to receive an end plate 7. The annular ring 2 is also provided with an annular flange 8 which is interiorly screw-threaded to receive an end plate 9 which is thus adapted to tightly close the end of the reel opposite the end plate 7. The end plates 7 and 9 are provided with centrally located and alined adjustable bearings 10, 11, which are screwed into place and locked by means of cap nuts 12, 13.

A shaft 14 having its opposite ends journaled in the bearings 10, 11, carries a spool which comprises a body 15 and heads 16, 17, permanently secured by any well known means to the body 15. The spool is mounted fast on the shaft 14.

A wide-faced driving pinion 18 is loosely and slidably mounted upon an extension of the bearing 11, screwed into the end plate 9, and is provided with an inclined toothed clutch member 19, which engages an adjacent oppositely inclined toothed clutch member 20, secured by means of screws 21, to the body 15 of the spool. A spring 22 surrounds the extension of the bearing and tends to force the pinion 18 and sliding clutch member 19 toward its adjacent clutch member 20.

The main driving gear is denoted by 23, the teeth of which are always in mesh with the teeth of the pinion 18, said driving gear wheel being formed integral with a hollow driving shaft 24 journaled upon a stationary shaft 25, one end of which is rigidly supported in a bracket 26 secured to the inner face of the end plate 9, the outer end of the hollow driving shaft being journaled within a tubular extension 27 also secured to the end plate 9.

A balanced driving crank 28 of the reel is secured to the outer end of the hollow driving shaft 24, as shown at 29.

The device shown for operating the throwing in or out of the sliding clutch member 19, is as follows: A bracket 30 is secured to the end plate 9 by means of screws denoted by 31. Mounted in this bracket is a rocking lever 32 pivoted at 33, one end of which is forked at 34, which embraces the toothed movable clutch member 19 and presses upon a loosely mounted ring 35 fitted to rotate freely with the movable clutch member 19. This ring 35 serves to take the friction between the fork 34 and the movable clutch member 19. The other end of the rocking lever 32 extends into engagement with an oscillating rim or cylinder cam 36, which is mounted to oscillate in the end plate 9. This cylinder or rim cam 36 is provided upon the inside with a flange 37, which shoulders against the end plate, and passing through has secured to it a crank 38, by means of the end of the cylinder cam being threaded to receive a screw and washer 39. The crank 38 serves to oscillate the rim cam 36 to the position as shown in dotted lines in Fig. 1.

In operation, as shown in Figs. 1, 2 and 4 of the drawing, the reel is in position for the winding in of the line and the assumption is that the angler is reeling in a fish. Should the fish now dive and pull and exert additional strain upon the line, the angler will operate the crank 38, rocking it to the right in the direction of the arrow, a sufficient distance, according to his judgment as to the size and strength of the fish, thereby permitting a slip of the spool and relieving the strain on the line. This rocking of the lever 38 rotates the rim cam 36, which in turn acts upon the rocking lever 32 which presses on the sliding clutch member 19, against the tension of the spring, thereby forcing the clutch members 19 and 20 slightly apart, thus permitting the clutch member 20 on the spool to slip back until it catches the next tooth, thus slightly checking the reel as the extra pull or jerk is exerted by the fish. The crank 38 is rocked more or less to the right, according to the strength of the fish, enabling the angler to apply any amount of friction, depending on the gamy nature of the fish to be caught. The more the lever is rocked to the right, the less the amount of friction obtained until the lever is rocked all the way or one half a revolution of the rim cam, when the clutch member will be entirely separated and the reel will run freely as shown in Fig. 3 of the drawings.

When the crank 38 is in its extreme position to the left, as shown in Fig. 1, it is then in its maximum degree of friction and will require the greatest amount of pull on the line to slip back. In this position the rocking lever 32 is at the lowest point on the cam, the spring pushing the sliding member of the clutch to the extreme limit of its movement. Also, in this position when the reel is being driven to wind in the line, the inclined faces of the clutch members constitute the driving faces thereof. When the crank 38 is in its extreme position to the right, as shown in dotted lines in Fig. 1, the reel is then free, as when casting or paying out the line. In this position the rocking lever 32 is on the high part of the cam, the forked end of the lever pressing the friction ring and clutch member to the limit of their movement to the right, thereby compressing the spring.

It will thus be seen that my improved fishing reel may be used with various kinds of fishing, and enables the angler to apply a varied degree of tension dependent upon the gamy nature of the fish to be caught.

I do not wish to limit myself strictly to the structure set forth, but

What I claim is:

1. In a fishing reel, the combination of a spindle having a spool mounted thereon, a bearing for the spindle, a clutch mechanism for positively engaging said spool comprising a rotatable and sliding member mounted upon aforesaid bearing and a fixed member carried by the said spool, the engaging faces of the teeth on each clutch member being oppositely inclined, means for rotating said sliding clutch member and means for gradually disengaging the inclined teeth of the clutch members and holding said members in any intermediate position.

2. In a fishing reel, the combination of a spindle having a spool mounted thereon, a bearing for the spindle, a clutch mechanism for positively engaging said spool comprising a clutch member carried by said spool, the other clutch member loosely and slidably mounted upon aforesaid bearing, the engaging faces of the teeth on each clutch member being oppositely inclined, yielding means for holding said clutch members in engagement also carried by said spindle, means for rotating said sliding clutch member, a rocking lever for forcing said sliding clutch member away from its adjacent member, a cam for operating said lever and a crank for rocking said cam.

3. In a fishing reel, the combination of a spindle having a spool mounted thereon, a bearing for the spindle, a clutch mechanism for positively engaging said spool comprising a clutch member carried by said spool, another clutch member loosely and slidably mounted upon aforesaid bearing, the engaging faces of the teeth on each clutch member being oppositely inclined, yielding means for holding said clutch members in engagement also carried by said spindle, a pinion carried by said sliding clutch member, a gear wheel for driving said pinion, a crank for driving said gear wheel, a rocking lever for forcing said sliding clutch member away from its adjacent clutch member, a cam for operating said lever and a crank for rocking said cam.

4. In a fishing reel, the combination of a spindle having a spool mounted thereon, a bearing for the spindle, a clutch mechanism for positively engaging said spool comprising a rotatable and sliding member mounted upon aforesaid bearing, and a fixed member carried by the said spool, the engaging faces of the teeth on each clutch member being oppositely inclined, yielding means for normally holding said clutch members in engagement also carried by said spindle, a pinion carried by said sliding clutch member, a gear wheel for driving said pinion, a crank for driving said gear wheel, a rocking lever for forcing said sliding clutch member away from its adjacent member, an oscillating cam for operating said lever and a crank for rocking said cam.

In testimony, that I claim the foregoing as my invention, I have signed my name in presence of two witnesses, this eighth day of May, 1912.

FRANK SINSINGER.

Witnesses:
F. GEORGE BARRY,
HENRY C. THIEME.